US012223087B2

(12) United States Patent
Lee et al.

(10) Patent No.: US 12,223,087 B2
(45) Date of Patent: Feb. 11, 2025

(54) SYSTEM FOR PROVIDING PERSONAL INFORMATION-BASED SPEECH INFORMATION PROCESSING SERVICE

(71) Applicant: MindwareWorks Co., Ltd., Seoul (KR)

(72) Inventors: Jae In Lee, Goyang-si (KR); Hyun Sun Cho, Seoul (KR)

(73) Assignee: MindwareWorks Co., Ltd., Seoul (KR)

( * ) Notice: Subject to any disclaimer, the term of this patent is extended or adjusted under 35 U.S.C. 154(b) by 266 days.

(21) Appl. No.: 17/917,262

(22) PCT Filed: May 3, 2021

(86) PCT No.: PCT/KR2021/005541
§ 371 (c)(1),
(2) Date: Oct. 6, 2022

(87) PCT Pub. No.: WO2021/246658
PCT Pub. Date: Dec. 9, 2021

(65) Prior Publication Data
US 2023/0161901 A1  May 25, 2023

(30) Foreign Application Priority Data
Jun. 3, 2020 (KR) .................. 10-2020-0067030

(51) Int. Cl.
*G06F 21/62* (2013.01)
*G10L 15/26* (2006.01)

(52) U.S. Cl.
CPC .......... *G06F 21/6245* (2013.01); *G10L 15/26* (2013.01)

(58) Field of Classification Search
None
See application file for complete search history.

(56) References Cited

U.S. PATENT DOCUMENTS

| 7,650,628 | B2 * | 1/2010 | Zimmerman | G16H 10/60 726/2 |
| 10,032,046 | B1 * | 7/2018 | Hayashi | H04L 63/0245 |
| 10,747,894 | B1 * | 8/2020 | Cline | G06F 40/35 |
| 11,120,199 | B1 * | 9/2021 | Bachtiger | G06F 40/284 |

(Continued)

FOREIGN PATENT DOCUMENTS

| KR | 10-2001-0086475 A | 9/2001 |
| KR | 10-1955025 B1 | 3/2019 |

(Continued)

OTHER PUBLICATIONS

International Search Report for PCT/KR2021/005541 mailed Aug. 23, 2021 from Korean Intellectual Property Office.

*Primary Examiner* — Christopher C Harris
(74) *Attorney, Agent, or Firm* — Revolution IP, PLLC (57) ABSTRACT

Disclosed is a system for providing a personal information-based speech information processing service, and a system for providing a speech information processing service based on personal information protection, in which speech information including personal information is prevented from being fraudulently used in a cloud network or a public network, and personal information that needs to be protected is blocked not to be transmitted to/stored in/managed by a cloud service server regardless of a user's recognition.

3 Claims, 2 Drawing Sheets (56) References Cited

U.S. PATENT DOCUMENTS

| | | | |
|---|---|---|---|
| 11,250,876 B1* | 2/2022 | McCloskey | G06N 20/10 |
| 2018/0068124 A1 | 3/2018 | Medvedev | |
| 2018/0198602 A1* | 7/2018 | Duffy | G06F 40/117 |
| 2018/0268930 A1 | 9/2018 | Lee | |
| 2019/0377901 A1* | 12/2019 | Balzer | G06F 21/6254 |
| 2020/0349278 A1 | 11/2020 | Lee et al. | |
| 2021/0125615 A1* | 4/2021 | Medalion | G06N 3/044 |
| 2021/0217414 A1* | 7/2021 | Hara | G10L 15/1815 |

FOREIGN PATENT DOCUMENTS

| | | | | |
|---|---|---|---|---|
| KR | 10-2019-0077769 A | | 7/2019 | |
| KR | 10-2020-0006375 A | | 1/2020 | |
| WO | WO-2019225201 A1 * | | 11/2019 | G06F 3/01 |

* cited by examiner

SYSTEM FOR PROVIDING PERSONAL INFORMATION-BASED SPEECH INFORMATION PROCESSING SERVICE

TECHNICAL FIELD

The disclosure relates to a system for providing a personal information-based speech information processing service, and a system for providing a speech information processing service based on personal information protection, in which speech information including personal information is prevented from being fraudulently used in a cloud network or a public network, and personal information that needs to be protected is blocked not to be transmitted to/stored in/managed by a cloud service server regardless of a user's recognition.

BACKGROUND ART

For various services, service providers related to various businesses may request and receive various pieces of information from a user or the user may willingly provide various pieces of information to the service providers. However, various pieces of information provided from a user to the service provider may involve personal information that needs to be protected.

Regarding a method of protecting such a user's personal information, Korean Patent Publication No. 2001-0086475 (hereinafter referred to as "related art") has disclosed a customized servicing method capable of performing marketing differentiated according to a user's classification while preventing the user's personal information from leaking outwards from a privately used and managed computer.

However, such a related art is limited only to software previously installed in a user's network connector defined and prepared in advance, but does not correspond to technology for protecting personal information involved in input information of many and unspecified users.

Recently, various cloud-based services have been spreading. With the spread of such services, there is growing concern about leakage of personal information that involves important personal identification information (a phone number, a detailed address, an E-mail address, account information, location information, a visit history, etc.) and is transmitted to/stored in/managed by overseas cloud service servers.

Specifically, inquiries including information willingly provided by general users to solve problems or information provided as requested by companies that provide services, i.e., service providers may involve the personal information that needs to be protected regardless of whether it is intended by the users or not. Such personal information is transmitted to/stored in/managed by a cloud/public-based system through the service provider, thereby causing a problem that the personal information leaks.

When speech information provided to the service provider is transmitted to/stored in/managed by the cloud or public network as requested by the service provider or as intended by a user, the speech information is likely to be fraudulently used by change, modification, etc., and the personal information involved in the speech information may be exposed, thereby causing serious problems.

Accordingly, there is a need for a technology that blocks a user's speech information itself not to be transmitted to the cloud or public network, and further there is a need for a technology that prevents the personal information involving important information, identification information and sensitive information from reaching a cloud service system (or a public service system) even though it is stated/specified in the process of using a corresponding service regardless of whether or not it is intended by a user.

DISCLOSURE

Technical Problem

An aspect of the disclosure is to provide a system for providing a speech information processing service based on personal information protection, in which speech information including personal information is prevented from being fraudulently used in a cloud network or a public network, and personal information that needs to be protected is blocked not to be transmitted to/stored in/managed by a cloud service server regardless of a user's recognition.

Technical Solution

To solve the foregoing problems, a system for providing a speech information processing service based on personal information protection is proposed including: a client terminal configured to be used by a user to transmit speech information; a contact center configured to store speech information received from the client terminal and at the same time transmit the speech information to a speech processing server; the speech processing server configured to convert the speech information received from the contact center into text information and transmit the text information to a relaying and processing server; the relaying and processing server configured to extract and process personal information from the text information received from the speech processing server, and then transmit processed text information including the processed personal information to a cloud service server; and the cloud service server configured to generate corresponding processed information by analyzing the processed text information received from the relaying and processing server and then transmit the generated corresponding processed information to the relaying and processing server.

Here, when the speech information may be converted into text information by the speech processing server and transmitted to the relaying and processing server, the speech information is deleted in the speech processing server.

Here, the contact center may be configured to verify whether the speech information is deleted in the speech processing server.

Further, the relaying and processing server may include: a personal information extractor configured to extract common personal information identification data including a common characteristic pattern and individual personal information identification data including an individual characteristic pattern from the text information, and a relay processor configured to process the common personal information identification data and individual personal information identification data extracted by the personal information extractor and then transmit the processed text information including such processed data.

Here, the common personal information identification data and individual personal information identification data extracted by the personal information extractor may be processed based on encryption or substitution.

Advantageous Effects

According to the disclosure, there are advantages in that speech information including personal information is prevented from being fraudulently used in a cloud network or a public network, and personal information that needs to be protected is blocked not to be transmitted to/stored in/managed by a cloud service server regardless of a user's recognition.

BEST MODE

Below, embodiments of a system for providing a speech processing service based on personal information protection according to the disclosure with the foregoing problems, solutions and effects will be described with reference to the accompanying drawings.

Figure 1:
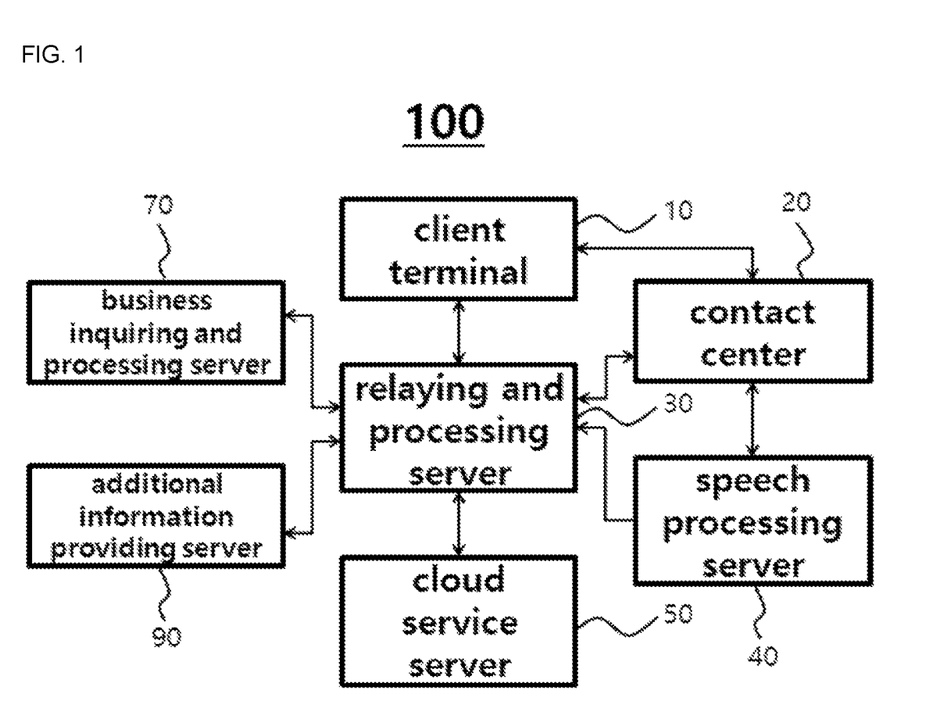
FIG. 1 is a schematic view of a system for providing a speech information processing service based on personal information protection according to an embodiment of the disclosure.
Figure 2:
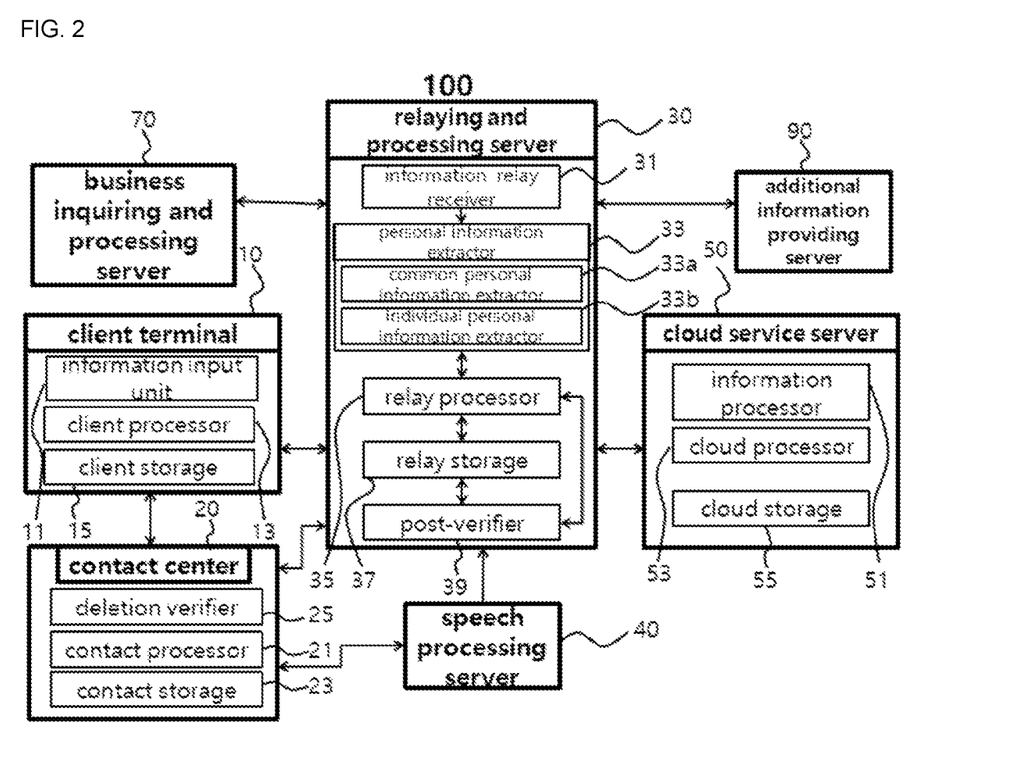
FIG. 2 is a detailed view of a system for providing a speech information processing service based on personal information protection according to an embodiment of the disclosure.

FIG. 1 is a block diagram of a system for providing a speech information processing service based on personal information protection according to an embodiment of the disclosure, and FIG. 2 is a detailed block diagram of the system.

As shown in FIGS. 1 and 2, a system 100 for providing a speech information processing service based on personal information protection according to an embodiment of the disclosure includes a client terminal 10 used by a user to input and transmit speech information, a contact center 20 configured to store and at the same time transmit the transmitted speech information to a cloud or public network, a speech processing server 40 configured to convert and output the speech information transmitted to the cloud or public network into text information, a relaying and processing server 30 configured to extract and process personal information that needs to be protected by screening the converted and output text information and relay the text information including the extracted personal information, i.e., the processed text information, and a cloud service server 50 configured to analyze the processed text information and generate and provide processed information corresponding to a user's speech information, i.e. corresponding processed information.

Further, the system 100 for providing a speech information processing service based on personal information protection according to an embodiment of the disclosure may include a business inquiring and processing server 70 configured to store and manage data to be referred to by the relaying and processing server 30, and an additional information providing server 90 configured to provide additional information requested by the relaying and processing server 30, as necessary.

The client terminal 10 refers to a terminal that is used to receive and transmit a user's speech information. The client terminal 10 may include any terminal that can be connected to the contact center 20 and a wired/wireless network. For example, the client terminal 10 may include a wire telephone, an Internet phone, a mobile phone, a smartphone, a desktop computer, a laptop computer, and the like as long as it can be connected to the contact center 20 and the network.

The client terminal 10 according to the disclosure performs an operation of transmitting the speech information to the contact center 20, but may also perform an operation of receiving information other than the speech information, i.e., nonspeech information such as a text and an image from a user and directly transmitting the received information to the relaying and processing server 30.

The speech information is information to be transmitted to the contact center 20 operated by a service providing business operator. The concept of speech information includes not only information transmitted by a user initiatively by connecting to the contact center 20 through the client terminal 10, but also speech information input and transmitted as an answer in response to the request of the contact center 20. Therefore, the speech information transmitted to the contact center 20 by the user to receive specific service or perform a specific business may include one piece of speech information, or a plurality of pieces of speech information to be provided as answers in response to the requests of the contact center 20.

On the other hand, the concept of nonspeech information includes not only information input by a user on his/her own initiative through the client terminal 10 and transmitted to the relaying and processing server 30, but also information input and transmitted as an answer in response to the request of the relaying and processing server 30. Therefore, the nonspeech information transmitted to the relaying and processing server 30 by the user to receive specific service or perform a specific business may include one piece of nonspeech information, or a plurality of pieces of speech information to be provided as answers in response to the requests of the relaying and processing server 30.

The speech information input to the client terminal 10 is transmitted to the contact center 20. The contact center 20 performs operations of storing the speech information received from the client terminal 10 and at the same time transmitting the speech information to the speech processing server 40. In other words, the contact center 20 stores and manages the speech information in its own storage (i.e., a contact storage 23) before transmitting the speech information to the cloud or public network, and transmits the stored speech information to the cloud or public network in the form of an audio file.

The contact center 20 refers to a contact center operated by a service providing business operator that performs a specific (financial, medical, travel, educational, lodging, shopping, etc.) service or business. Therefore, many and unspecified persons or the like who has no authority cannot access the speech information stored and managed in the contact center 20, unlike speech information transmitted to the cloud or public network to which many and unspecified persons can have an access.

The speech information transmitted from the contact center 20 in the form of the audio file is input to the speech processing server 40 provided in the cloud or public network. The speech processing server 40 performs operations of converting the speech information transmitted from the contact center 20 in the form of the audio file into text information, and outputting the text information to the relaying and processing server 30.

The speech processing server 40 may be separately provided in the cloud or public network, but may be included in the relaying and processing server 30. In other words, the speech processing server 40 may be included as an element of the relaying and processing server 30, and perform the operation of converting the speech information received from the contact center 20 in the form of the audio file into the text information. Of course, the converted text information is analyzed and processed in the relaying and processing server 30.

The text information converted by and output from the speech processing server 40 is input or transmitted to and relayed and processed by the relaying and processing server 30. In other words, the relaying and processing server 30 performs a relaying process to process the text information converted from the speech information and transmit the processed text information to the cloud service server 50. Further, the relaying and processing server 30 receives a processing result related to the text information performed by the cloud service server 50, i.e., the corresponding processed information, and transmits the corresponding processed information to the contact center 20 or the client terminal 10.

Specifically, the relaying and processing server 30 extracts and processes personal information included in the text information transmitted from the speech processing server 40, and then transmits the processed text information including the processed personal information to the cloud service server 50. Further, the relaying and processing server 30 performs operations of transmitting the corresponding processed information from the cloud service server 50 to the client terminal 10 and the contact center 20 that transmits and receives the speech information, or directly transmitting the corresponding processed information to the client terminal 10.

Meanwhile, the relaying and processing server 30 directly receives a text or the like nonspeech information from the client terminal 10, extracts and processes the personal information included in the nonspeech information (corresponding to the text information), and then transmits the processed text information including the processed personal information to the cloud service server 50, separately from the operation of receiving and analyzing the text information related to the speech information from the speech processing server 40. Further, the relaying and processing server 30 performs an operation of directly transmitting the corresponding processed information from the cloud service server 50 to the client terminal 10.

First, the relaying and processing server 30 may be a service providing server operated by each of service providers, i.e., service providers that perform a specific (financial, medical, travel, educational, lodging, shopping, etc.) service or business, or a service providing server operated by a service agent that provides integrated service on behalf of the service providers that provide the above specific business.

The relaying and processing server 30 does not relay the text information converted from the speech information received from the speech processing server 40 or the text information related to the nonspeech information directly input from the client terminal 10 so as to be transmitted to the cloud service server 50 as it is, but extracts the personal information that needs to be protected and processes the personal information through a specific method by screening whether the text information includes the personal information that needs to be protected, so that the processed text information where this processed personal information and the remaining text information that does not correspond to the personal information are added is transmitted to the cloud service server 50.

For example, when the text information includes a sentence of "a, b, c, c, e, f, g . . . " and it is identified that "a" corresponding to a word or data (stream) is the personal information or includes the personal information, the relaying and processing server 30 processes "a" into "*" and transmits the processed text information of "*, b, c, c, e, f, g . . . " including the processed personal information of "*" to the cloud service server 50.

Eventually, the relaying and processing server 30 does not transmit the text information including the personal information as it is to the cloud service server 50, but processes a part corresponding to the personal information not to be recognizable by people and then transmits the processed text information to the cloud service server 50. Therefore, the user's personal information is transmitted to the cloud service server 50 after it is properly processed, thereby achieving an effect of protecting the personal information protection.

The cloud service server 50 generates the corresponding processed information based on the processed text information and transmits the generated processed information to the relaying and processing server 30. Then, the relaying and processing server 30 transmits the corresponding processed information received from the cloud service server 50 to the contact center 20 that transmits and receives the speech information to and from the client terminal 10 or to the client terminal 10 that inputs and transmits inquiry or the like nonspeech information.

As above, the cloud service server 50 performs operations of generating the corresponding processed information by analyzing the processed text information received from the relaying and processing server 30, and then transmitting the generated processed information to the relaying and processing server 30. The cloud service server 50 refers to a business server that provides a cloud service, and constitutes a public system. According to the disclosure, the cloud service server 50 corresponds to a cloud service server that is used by a service agent or a service provider related to a specific service or business and operating the relaying and processing server 30. Specifically, the cloud service server 50 constitutes a cloud service system or public service system that answers, replies and processes various inquiries, requests and businesses.

The cloud service server 50 receives the processed text information and analyzes the remaining text information except the processed personal information because the processed personal information included in the processed text information is not recognizable, thereby generating the corresponding processed information ad transmitting the generated processed information to the relaying and processing server 30.

The system 100 for providing a speech information processing service based on personal information protection with the foregoing configurations and operations according to the disclosure has advantages in that speech information including personal information is prevented from being fraudulently used in the cloud network or the public network, and personal information that needs to be protected is blocked not to be transmitted to/stored in/managed by a cloud service server regardless of a user's recognition.

Mode for Invention

Below, the contact center 20, the speech processing server 40, the relaying and processing server 30, the client terminal 10, and the cloud service server 50 in the system 100 for providing a speech information processing service based on personal information protection will be described in detail with respect to their configurations and operations and associated operations with other configurations.

The contact center 20 includes a contact processor 21 to transmit and receive the speech information to and from the client terminal 10, store and manage the speech information to be transmitted, and transmit the speech information to the speech processing server 40. The contact processor 21 performs operations of transmitting and receiving the speech information to and from the client terminal 10 with regard to a specific service or business. In other words, while a user connects to the contact center 20 through the client terminal 10 and transmits and receives the speech information to and from the client terminal 10, or while the contact center 20 initiatively tries connecting to the client terminal 10 and transmits and receives the speech information, the contact processor 21 processes the speech information to be transmitted to and received from the client terminal 10.

The contact processor 21 ensures that the speech information transmitted through the client terminal 10 is stored in and managed by the contact storage 23 without being directly transmitted to the cloud or public network. In other words, the contact storage 23 stores and manages the speech information transmitted from the client terminal 10 under control of the contact processor 21. The speech information stored in and managed by the contact storage 23 is not accessible by many and unspecified persons because it is stored in and managed by the contact storage 23 of the contact center 20 operated by the service provider unlike information present in the cloud or public network, and the speech information is thus prevented from being fraudulently used.

The speech information stored in and managed by the contact storage 23 is transmitted to the inside of the cloud or public network, specifically, to the speech processing server 40, in the form of an audio file, under control of the contact processor 21. The speech processing server 40 converts the speech information received in the form of the audio file into text information, and outputs the text information. As described above, the speech processing server 40 may be provided separately from the relaying and processing server 30, or may be provided as an internal element of the relaying and processing server 30. However, the text information output from the speech processing server 40 is analyzed and processed in the relaying and processing server 30.

Because the speech processing server 40 is provided inside the cloud or public network, the speech information transmitted to the speech processing server 40 in the form of the audio file may remain in the cloud or public network. To this end, the speech processing server 40 necessarily performs a operation for processing the speech information to be deleted after converting the speech information into the text information and transmitting the text information to the relaying and processing server 30.

Specifically, when the speech information is converted into the text information by the speech processing server 40 and transmitted to the relaying and processing server 30, the speech information is deleted from the speech processing server 40. The speech information may be manually or automatically deleted by the speech processing server 40. For example, the speech processing server 40 includes a first-in first-out (FIFO) buffer capable of temporarily storing the speech information transmitted in the form of the audio file, so that the speech information converted into the text information can be automatically deleted in order of old speech information. The FIFO buffer may have a small capacity so that only several pieces of speech information given in the form of the audio files can be temporarily stored and then automatically deleted immediately after being converted into the text information.

In this way, the speech processing server 40 deletes the speech information after converting it into the text information, thereby preventing the speech information from remaining in the cloud or public network, in which the speech processing server 40 is present, and thus from being fraudulently used or misused by many and unspecified persons.

However, when the speech processing server 40 does not intentionally or unintentionally delete the speech information converted into the text information or when the deletion is not processed, there may be a problem that the speech information may still remain in the cloud or public network.

To solve this problem, the contact center 20 performs an operation of verifying whether the speech information is deleted from the speech processing server 40. In other words, the contact center 20 includes a deletion verifier 25 to perform operations of monitoring and verifying whether the speech information converted into the text information has been normally deleted from the speech processing server 40.

The deletion verifier 25 may employ and apply one among various methods of verifying the deletion of the speech information from the contact center 20. For example, the deletion verifier 25 may detect the current status of the speech information input to the contact center 20 and the current status of the text information output from the contact center 20, and verify whether the speech information is processed based on the capacity of the FIFO buffer provided in the contact center 20.

The relaying and processing server 30 includes an information relay receiver 31 to first receive the text information related to the speech information transmitted from the speech processing server 40 and further receive the text information related to the nonspeech information transmitted from the client terminal 10. The information relay receiver 31 transmits the received text information to a personal information extractor 33 so that the personal information extractor 33 can analyze whether the text information includes the personal information.

The personal information extractor 33 performs an operation of extracting the personal information that is included in the text information and needs to be protected. As described above, the concept of the personal information includes all kinds of information related to personal protection, such as important information, sensitive information, history information, and identification information of an individual. Such personal information may be broadly divided into two kinds, for example, common personal information identification data that is personal information commonly applied to the public, and individual personal information identification data that is personal information related to a specific service or business and individually applied to each individual.

The common personal information identification data does not correspond to the personal information limited to only to a specific person, but refers to the personal information commonly applied to users or the public, for example, identification data such as an E-mail address, a phone number, and a resident registration number. Such common personal information identification data includes a characteristic pattern, i.e., a common characteristic pattern to be used in identifying the personal information that needs to be protected. For example, the common characteristic pattern may correspond to ".com," ".net," etc., as patterns for characterizing the common personal information identification data, i.e., the E-mail address, may correspond to "010," "0502," etc., as patterns for characterizing the phone number, and may correspond to "****–1****," etc., in which a digit number is taken into account, as a pattern for characterizing the resident registration number.

On the other hand, the individual personal information identification data does not correspond to the personal information commonly and uniformly applied to the public, but refers to the personal information individually applied in relation to a specific service or business, for example, personal information related to a specific service or business for financial, lodging, travel, educational, medical, shopping, etc., more specifically, "credit rating: first rating," related to the financial business, and "disease name: mental illness" related to the medical business. Such individual personal information identification data also includes a characteristic pattern, i.e., an individual characteristic pattern to be used in identifying the personal information that needs to be protected. For example, the individual characteristic pattern may correspond to "credit," "class," etc. as patterns for characterizing the individual personal information identification data, i.e., the "credit rating: first rating," and may correspond to "mental illness," "disease name," etc. as patterns for characterizing the "disease name: mental illness."

As described above, the personal information extractor 33 according to the disclosure extracts not only the common personal information identification data corresponding to the personal information to be commonly applied to the public, but also the individual personal information identification data corresponding to the personal information related to a specific service or business, as the personal information to be protected.

In other words, the personal information extractor 33 performs operations of extracting the common personal information identification data having the common characteristic pattern, and the individual personal information identification data having the individual characteristic pattern from the text information. The personal information extractor 33 extracts two types of personal information step by step. To this end, the personal information extractor 33 includes a common personal information extractor 33a, and an individual personal information extractor 33b.

The common personal information extractor 33a extracts the common personal information identification data having the common characteristic pattern from the text information. Specifically, the common personal information extractor 33a detects whether the common characteristic pattern is present, while screening the text information. When the presence of the common characteristic pattern is detected, data (stream) having this common characteristic pattern is extracted as the common personal information identification data. At least one common characteristic pattern is stored in and managed by a relay storage 37 in advance, and updated continuously. Therefore, the common personal information extractor 33a may detect the common characteristic pattern through a process of screening whether the common characteristic pattern(s) stored in and managed by the relay storage 37 is present in the text information, and then extract the common personal information identification data having the detected common characteristic pattern.

On the other hand, the individual personal information extractor 33b extracts the individual personal information identification data having the individual characteristic pattern from the text information. Specifically, the individual personal information extractor 33b detects whether the individual characteristic pattern is present, while screening the text information. When the presence of the individual characteristic pattern is detected, data (stream) having this individual characteristic pattern is extracted as the individual personal information identification data. At least one individual characteristic pattern is stored in and managed by the relay storage 37 in advance, and updated continuously. Therefore, the individual personal information extractor 33b may detect the individual characteristic pattern through a process of screening whether the individual characteristic pattern(s) stored in and managed by the relay storage 37 is present in the text information, and then extract the individual personal information identification data having the detected individual characteristic pattern.

The common and individual personal information identification data extracted by the personal information extractor 33 are processed by a relay processor 35, and then transmitted to the cloud service server 50 as included in the transmitted text information. In this way, the relay processor 35 processes the extracted common personal information identification data and the extracted individual personal information identification data by a predetermined method, and then transmits the processed text information, which is obtained by reflecting this processed personal information identification data to the text information, to the cloud service server 50.

In brief, the relay processor 35 processes the common personal information identification data and the individual personal information identification data extracted by the personal information extractor 33, and then transmits the processed text information including such processed data to the cloud service server 50. More specifically, the relay processor 35 receives the text information received in the information relay receiver 31, and then generates the processed text information by processing the common personal information identification data and the individual personal information identification data, which are included in and extracted from the text information by the personal information extractor 33, by a predetermined method, thereby performing the operation of transmitting the generated processed text information to the cloud service server 50.

Here, the processing performed by the relay processor 35 refers to a process of processing the common personal information identification data and the individual personal information identification data, which are included in the text information, not to be recognizable to the public. Specifically, the common personal information identification data and the individual personal information identification data extracted by the personal information extractor 33 are processed to be encrypted or substituted by the relay processor 35. In other words, the relay processor 35 performs the processing in such a manner that the common personal information identification data and the individual personal information identification data are encrypted, replaced with a specific character (string), or substituted with masking not to be recognizable.

When the relay processor 35 transmits the processed text information to the cloud service server 50, the cloud service server 50 generates the corresponding processed information corresponding to the text information related to the speech information based on the processed text information, and transmits the generated processed information to the relay processor 35 of the relaying and processing server 30.

To this end, the cloud service server 50 includes an information processor 51, a cloud processor 53, and a cloud storage 55.

The cloud processor 53 receives the processed text information from the relay processor 35, and transmits such processed text information to the information processor 51, thereby generating the corresponding processed information. Further, the cloud processor 53 processes the processed text information to be stored in the cloud storage 55. In this case, the cloud processor 53 stores the processed text information in the cloud storage 55 while classifying the processed text information by matching message identification (ID).

The information processor 51 receives the processed text information from the cloud processor 53 and generates the corresponding processed information corresponding to the text information by analyzing the received processed text information, thereby transmitting the generated corresponding processed information to the cloud processor 53. Then, the cloud processor 53 stores the corresponding processed information in the cloud storage 55 by matching the message ID, and at the same time transmits the message ID together with the corresponding processed information to the relay processor 35. Here, the text information may include inquiry or check content or the like, and the corresponding processed information may include an answer or processed content to the inquiry or check content.

In this way, when transmitting a message corresponding to the corresponding processed information to the relaying and processing server 30, specifically, to the relay processor 35, the cloud processor 53 transmits and receives the message ID corresponding to the corresponding processed information. Of course, the cloud processor 53 processes the corresponding processed information and the processed text information related to the corresponding processed information to be stored and managed corresponding to the message ID in the cloud storage 55.

When the relay processor 35 receives the corresponding processed information together with the message ID from the cloud processor 53, the relay processor 35 stores and manages the processed text information related to the corresponding processed information while matching the message ID. In this case, the relay processor 35 may also store and manage the corresponding processed information together with the processed text information while matching the message ID.

Specifically, the relay processor 35 transmits the processed text information to the cloud service server 50 and at the same time stores the processed text information in the relay storage 37. Then, the relay processor 35 receives the message ID together with the corresponding processed information as a processing result of the processed text information from the cloud processor 53, and stores and manages the message ID while matching the processed text information stored in the relay storage 37.

Eventually, the relay processor 35 stores and manages all the pieces of processed text information transmitted to the cloud service server 50 by matching the message ID received from the cloud processor 53, in order to classify all the pieces of processed text information. Therefore, when certain processed text information needs to undergo deletion or addition processing based on post-verification in the future, the relay processor 35 may request the cloud processor 53 to delete the certain processed text information or process additional personal information identification data included therein through the message ID. In this regard, descriptions will be made later.

As described above, the relay storage 37 stores and manages the common characteristic pattern and the individual characteristic pattern, and stores and manages the processed text information while matching the message ID. In this way, the relay storage 37 stores and manages the processed text information processed by the relay processor 35 while matching the message ID.

In the case where the processed personal information included in the processed text information is processed by encryption and then stored in the relay storage 37, the processed personal information may be restored by decryption when the restoration is needed. In other words, when a user or the contact center 20 requests an inquiry about the processed text information stored and managed in the relay storage 37, the processed personal information processed by the encryption is restored by the decryption and then transmitted to the client terminal 10 or contact center 20 being used by the user.

On the other hand, in the case where the processed personal information included in the processed text information is processed by the substitution, etc. and then stored in the relay storage 37, a problem may occur because the processed personal information is not subject to the decryption when the restoration is needed in the future. Therefore, when the relay processor 35 stores the processed text information in the relay storage 37, the processed personal information processed by a method other than the encryption, i.e., by the substitution may be stored together with the original of the processed personal information (original information, i.e., personal information before the processing). As a result, when a user requests an inquiry about the processed text information stored in and managed by the relay storage 37, the processed personal information processed by a method other than the encryption, i.e., by the substitution, etc. may be restored based on the original stored and managed together, and then transmitted to the client terminal 10 being used by the user.

As described above, the relay processor 35 receives the corresponding processed information together with the message ID from the cloud processor 53, and stores and manages the message ID while matching the processed text information related to the corresponding processed information. Further, the relay processor 35 transmits the corresponding processed information to the client terminal 10 and the contact center 20 that transmits and receives the speech information. Then, the contact center 20 secures information needed in itself or information desired or requested by a user who is using the client terminal 10, thereby processing a specific service or business. Meanwhile, the relay processor 35 transmits the corresponding processed information to the client terminal 10 being used by the user who transmits the nonspeech information such as a text (for example, a text related to an inquiry or the like). Then, the user can solve a problem that s/he wants to solve.

Through such processes, the speech information transmitted by a user, and further the text information corresponding to a text or the like nonspeech information are transmitted to the cloud service server 50 through the relaying process of the relaying and processing server 30, and the corresponding processed information processed in the cloud service server 50 is provided to the contact center 20 or/and the client terminal 10 through the relaying and processing server 30, thereby finally completing the provision of the speech information processing service, and further the nonspeech information processing service related to the inquiry requested by the text or the like.

With this process, when the provision of the speech information or/and nonspeech information processing service is completed, the post-verification may be performed to strengthen the protection of the personal information. To this end, the relaying and processing server 30 according to the disclosure further includes a post-verifier 39 to transmit the corresponding processed information to the contact center 20 or/and the client terminal 10, and then extract additional personal information identification data having a variant characteristic pattern from the text information.

There may be personal information not extracted in the personal information extracting process for the first text information, i.e., in the personal information extracting process of the personal information extractor 33. In other words, the additional personal information identification data, which has not been extracted by the personal information extractor 33, may still remain in the processed text information.

Therefore, when the relay processor 35 completes the transmission of the corresponding processed information to the contact center 20 or/and the client terminal 10, the post-verifier 39 controls the additional personal information identification data to be extracted from the processed text information stored matching the message ID in the relay storage 37.

In other words, when the relay processor 35 instructs the post-verification for the processed text information, the post-verifier 39 identifies whether a variant characteristic pattern is present by screening the processed text information stored in the relay storage 37 and extracts the additional personal information identification data including this variant characteristic pattern when the presence of the variant characteristic pattern is detected.

The variant characteristic pattern includes not only a pattern variant from the common characteristic pattern and the individual characteristic pattern, but also a pattern characterizing the personal information which has not been extracted based on the common characteristic pattern and the individual characteristic pattern. For example, the variant characteristic pattern may relate to the E-mail address and correspond to not ".com (dot com)" but ".com (dot space com)", and may correspond to a pattern with incorrect spelling or an orthographic error in the common characteristic pattern and the individual characteristic pattern.

The variant characteristic pattern is also stored in and managed by the relay storage 37, and continuously updated. Considering that problems may arise in orthography, spelling, spacing, etc. in the process of converting the speech information into the text information through the speech processing server 40, and incorrect orthography, spelling, spacing, etc. are frequently included in a text or the like nonspeech information input by a user, it is necessary to significantly increase the number of cases for the variant characteristic pattern, and it is necessary to continuously update the variant characteristic pattern with various additional patterns.

When the variant characteristic pattern is detected, the post-verifier 39 extracts the data (stream) including the variant characteristic pattern as additional personal information identification data and transmits the additional personal information identification data to the relay processor 35. Then, the relay processor 35 processes the additional personal information identification data, and stores re-processed text information including this processed additional personal information identification data in the relay storage 37 again. Of course, the message ID of the re-processed text information is the message ID matching the processed text information.

Meanwhile, the relay processor 35 requests the change of the message, i.e., the processed text information while transmitting the re-processed text information together with the message ID matching the processed text information (i.e., the re-processed text information) to the cloud processor 53. Then, the cloud processor 53 searches for the message corresponding to the message ID, i.e., the processed text information, among the messages stored in and managed by the cloud storage 55 with reference to the message ID, and replaces the found message with the re-processed text information.

As a result, the relaying and processing server 30 itself performs the post-verification to strengthen the personal information protection, thereby having an effect on further securing the personal information protection.

Meanwhile, the post-verification may be performed based on the request of the contact center 20.

The contact processor 21 processes the speech information received from the client terminal 10 to be stored in the contact storage 23 and at the same time to be transmitted to the speech processing server 40.

Then, the contact processor 21 responds to the requests from the relay processor 35 of the relaying and processing server 30. For example, when the relay processor 35 requests an additional inquiry about the corresponding processed information, the contact processor 21 serves to transmit an answer to the request to the relay processor 35.

Meanwhile, the contact processor 21 may receive the corresponding processed information from the relaying and processing server 30, specifically, from the relay processor 35, and then request an inquiry about the text information converted from the speech information transmitted by itself. When the inquiry based on the request is allowed by the relay processor 35, a person in charge of the contact center 20 can inquire the text information through the contact processor 21. The person in charge of the contact center 20 may inquire the processed text information by directly accessing the relay storage 37, or may inquire the text information restored under control of the relay processor 35.

As a result of the inquiry, when the processed text information that needs to be removed is present or the processed text information includes a part that needs to be processed, the person in charge of the contact center 20 makes the processed text information desired to be removed or the part included in the processed text information and required to be processed to the relay processor 35 through the contact processor 21 be transmitted to the relay processor 35. Then, the relay processor 35 transmits the message ID matching the processed text information, which is requested to be removed by the contact processor 21 of the contact center 20, to the cloud processor 53 so that the processed text information stored in the cloud storage 55 can be removed, or processes the part requested for processing by the contact processor 21 and makes the re-processed text information including this processed part be stored again in the relay storage 37. Of course, the message ID of the re-processed text information is the message ID matching the processed text information.

Meanwhile, the relay processor 35 requests the change of the message, i.e., the processed text information while transmitting the re-processed text information together with the message ID matching the processed text information (i.e., the re-processed text information) to the cloud processor 53. Then, the cloud processor 53 searches for a message, i.e., the processed text information corresponding to the message ID among the messages stored in and managed by the cloud storage 55 with reference to the message ID, and replaces the found processed text information with the re-processed text information.

Meanwhile, the post-verification may be performed based on a user's request. Specifically, a user may indirectly request the post-verification via the contact center 20, or may directly request the post-verification by connecting to the relaying and processing server 30. In the former case, the post-verification is performed by the contact center 20 as described above. In the latter case, the post-verification is as follows.

The client terminal 10 includes an information input unit 11 through which a text or the like nonspeech information is input, and not only a client storage 15 but also a client processor 13 to store and manage the messages received from the relaying and processing server 30.

Through the information input unit 11, a text or the like nonspeech information is input under control of a user. Then, the client processor 13 transmits the text or the like nonspeech information to the relaying and processing server 30, specifically, to the information relay receiver 31, and at the same time stores the text or the like nonspeech information in the client storage 15.

Then, the client processor 13 performs a response to the request from the relay processor 35 of the relaying and processing server 30. For example, when the relay processor 35 requests an additional inquiry about the corresponding processed information, the client processor 13 allows a user to recognize the request, and then transmits an answer to the additional inquiry input through the information input unit 11 to the relay processor 35.

Meanwhile, the client processor 13 may receive the corresponding processed information from the relaying and processing server 30, specifically, from the relay processor 35, and then request an inquiry about the text information corresponding to the nonspeech information transmitted by itself under control of a user. When the inquiry based on the request is allowed by the relay processor 35, the user can inquire the text information. The user may inquire the processed text information by directly accessing the relay storage 37, or may inquire the text information restored under control of the relay processor 35.

As a result of the inquiry, when the processed text information that needs to be removed is present or the processed text information includes a part that needs to be processed, the user makes the processed text information desired to be removed or the part included in the processed text information and required to be processed to the relay processor 35 through the contact processor 21 be transmitted to the relay processor 35. Then, the relay processor 35 transmits the message ID matching the processed text information, which is requested to be removed by the user, to the cloud processor 53 so that the processed text information stored in the cloud storage 55 can be removed, or processes the part requested for processing by the user and makes the re-processed text information including this processed part be stored again in the relay storage 37. Of course, the message ID of the re-processed text information is the message ID matching the processed text information.

Meanwhile, the relay processor 35 requests the change of the message, i.e., the processed text information while transmitting the re-processed text information together with the message ID matching the processed text information (i.e., the re-processed text information) to the cloud processor 53. Then, the cloud processor 53 searches for a message, i.e., the processed text information corresponding to the message ID among the messages stored in and managed by the cloud storage 55 with reference to the message ID, and replaces the found processed text information with the re-processed text information.

As a result, the user carries out the post-verification to strengthen the personal information protection in person, thereby having an effect on furthermore securing the personal information protection.

Meanwhile, the cloud service server 50 according to the disclosure generates the corresponding processed information based on an unprocessed part of the processed text information, i.e., information other than the processed personal information. However, when it is determined that only the received processed text information is not enough to generate the corresponding processed information, the cloud service server 50, specifically, the information processor 51 transmits an inquiry that does not directly request the personal information, i.e., a bypass inquiry for recognizing specific personal information to the relay processor 35 via the cloud processor 53. Then, the relay processor 35 receives an answer to the bypass inquiry from the contact center 20 or/and the client terminal 10 being used by the user, and provides the answer to the information processor 51 through the cloud processor 53. Then, the information processor 51 may finally generate the corresponding processed information based on the answer to the bypass inquiry, and provide the generated corresponding processed information to the contact center 20 or/and the client terminal 10 through the relaying and processing server 30.

The bypass inquiry for recognizing the personal information refers to not an inquiry that requests an answer by which the personal information is directly exposed, but an inquiry that makes it possible to recognize the personal information without exposing the personal information. For example, when the information processor 51 needs to know a user's credit rating in order to generate the corresponding processed information, the personal information about such credit rating has already been processed (encrypted or replaced or substituted) in the processed text information, and therefore the processed text information is not enough to generate the corresponding processed information.

In this case, the information processor 51 transmits the bypass inquiry for recognizing the personal information, which allows the user to select '1' when the credit rating is the first rating, '2' when the credit rating is between the second rating and the third rating, and '3' when the credit rating is lower than the third rating, to the relaying and processing server 30, and receives an answer to the bypass inquiry through the contact center 20 or/and the client terminal. At this time, the answer to the bypass inquiry is transmitted as anyone of '1,' '2,' and '3,' and therefore the personal information is not transmitted to, stored in, and managed by the cloud service server 50.

In this way, according to the disclosure, even when only the transmitted processed text information is not enough to generate an answer, the corresponding processed information is generated and provided without exposing the personal information that needs to be protected, thereby having effects on not only securing the personal information protection but also improving inquiry processing service quality.

Meanwhile, the relaying and processing server 30, specifically, the relay processor 35 that receives the corresponding processed information from the cloud service server 50, specifically, from the cloud processor 53 may transmit the received corresponding processed information to the contact center 20 or/and the client terminal 10 as it is, but, in some cases, may transmit the received corresponding processed information to the contact center 20 or/and the client terminal 10 as it is added with additional information useful for the contact center 20 or/and the client terminal 10, i.e., a person in charge of the contact center or/and a user.

To this end, the system 100 for providing a speech information processing service based on personal information protection according to the disclosure may further include an additional information providing server 90 to provide additional information requested by the relay processor 35. In other words, the system 100 for providing a speech information processing service based on personal information protection according to an embodiment of the disclosure may further include the additional information providing server 90 to provide additional information for reinforcing the corresponding processed information as requested by the relaying and processing server 30.

The additional information providing server 90 may be a server that can provide additional information about anyone of weather, traffic and medicine, or a server that can provide additional information into which at least two pieces of information are integrated.

When it is determined that additional information needs to be added after receiving the corresponding processed information, the relay processor 35 makes a request for the additional information to the additional information providing server 90 and receives the corresponding additional information from the additional information providing server 90, and transmits the corresponding processed information together with the additional information to the contact center or/and the client terminal 10. The determination of whether it is necessary to add the additional information is based on a preset policy. For example, when the corresponding processed information is related to a travel destination, the relay processor 35 requests and receives weather information about the corresponding travel destination from the additional information providing server 90 based on the preset policy that the weather information about the corresponding travel destination is added and transmitted as the additional information, and transmits the corresponding processed information together with the additional information of the weather information to the client terminal 10.

Meanwhile, the relaying and processing server 30 according to the disclosure may need information about a service, a business or a customer, and need to provide the information. To this end, the system 100 for providing a speech information processing service based on personal information protection according to the disclosure may further include a business inquiring and processing server 70 so that the relaying and processing server 30 can receive information for service or business processing and information for inquiry processing and customer information processing.

Although a few embodiments of the disclosure have been described above, it will be apparent for a person having ordinary knowledge in the art that these descriptions are for the illustrative purposes only and various changes can be made without departing from the scope of the disclosure. Accordingly, the genuine technical scope of the disclosure should be defined by the appended claims.

INDUSTRIAL APPLICABILITY

A system for providing a speech information processing service based on personal information protection according to the disclosure prevents speech information including personal information from being fraudulently used in a cloud network or a public network, and blocks the personal information that needs to be protected so as not to be transmitted to/stored in/managed by a cloud service server regardless of a user's recognition, thereby having industrial applicability.

The invention claimed is:

1. A system for providing a speech information processing service based on personal information protection, the system comprising:
   a client terminal configured to be used by a user to transmit speech information;
   a contact center comprising a contact processor and a contact storage configured to store speech information received from the client terminal and at the same time transmit the speech information to a speech processing server;
   the speech processing server configured to convert the speech information received from the contact center into text information and transmit the text information to a relaying and processing server;
   the relaying and processing server configured to extract and process personal information from the text information received from the speech processing server, and then transmit processed text information comprising the processed personal information to a cloud service server; and
   the cloud service server configured to generate corresponding processed information by analyzing the processed text information received from the relaying and processing server and then transmit the generated corresponding processed information to the relaying and processing server,
   wherein upon the speech information is converted into text information by the speech processing server and transmitted to the relaying and processing server, the speech information is deleted in the speech processing server,
   wherein the speech processing server includes a first-in first-out (FIFO) buffer capable of temporarily storing several pieces of speech information given in the form of the audio files such that the speech information converted into the text information is automatically deleted in order of old speech information,
   wherein the contact center is configured to verify whether the speech information is deleted in the speech processing server.

2. The system of claim 1, wherein the relaying and processing server comprises:
   a relay processor configured to
      extract common personal information identification data comprising a common characteristic pattern and individual personal information identification data comprising an individual characteristic pattern from the text information, and
      process the common personal information identification data and individual personal information identification data extracted by the personal information extractor and then transmit the processed text information comprising such processed data.

3. The system of claim 2, wherein the common personal information identification data and individual personal information identification data extracted by the personal information extractor are processed based on encryption or substitution.

* * * * *